United States Patent
Zhang et al.

(10) Patent No.: US 8,627,546 B2
(45) Date of Patent: Jan. 14, 2014

(54) DUAL AXIS HINGE WITH ECCENTRIC CONNECTOR

(75) Inventors: Han-Zheng Zhang, Shenzhen (CN); Lian-Cheng Huang, Shenzhen (CN); Shen Li, Shenzhen (CN); Jin-Xin Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 367 days.

(21) Appl. No.: 12/970,980

(22) Filed: Dec. 17, 2010

(65) Prior Publication Data
US 2011/0289726 A1 Dec. 1, 2011

(30) Foreign Application Priority Data
May 28, 2010 (CN) .......................... 2010 1 0186037

(51) Int. Cl.
*E05D 15/00* (2006.01)
(52) U.S. Cl.
USPC ............. 16/368; 16/366; 16/371; 379/433.13
(58) Field of Classification Search
USPC ........... 16/282, 283, 285, 302, 303, 366, 368, 16/371; 455/575.3; 379/433.13; 361/679.06, 679.27, 679.55
See application file for complete search history.

(56) References Cited

U.S. PATENT DOCUMENTS

| | | | | |
|---|---|---|---|---|
| 6,253,419 B1* | 7/2001 | Lu | ................................... | 16/340 |
| 7,450,979 B2* | 11/2008 | Seo | .......................... | 455/575.4 |
| 7,515,707 B2* | 4/2009 | Ka et al. | .................... | 379/433.12 |
| 7,730,587 B2* | 6/2010 | Chang et al. | ..................... | 16/340 |
| 7,787,914 B2* | 8/2010 | Ahn et al. | ................... | 455/575.3 |
| 7,832,056 B2* | 11/2010 | Kuwajima et al. | ............... | 16/354 |
| 7,907,415 B2* | 3/2011 | Ueyama | ......................... | 361/749 |
| 8,291,549 B2* | 10/2012 | Huang et al. | ..................... | 16/303 |
| 8,296,905 B2* | 10/2012 | Zhang et al. | ..................... | 16/366 |
| 2009/0000062 A1* | 1/2009 | Yamanami | ....................... | 16/366 |
| 2009/0320243 A1* | 12/2009 | Wang et al. | ...................... | 16/303 |
| 2010/0071156 A1* | 3/2010 | Wang et al. | ...................... | 16/297 |
| 2011/0232035 A1* | 9/2011 | Huang et al. | ..................... | 16/303 |

FOREIGN PATENT DOCUMENTS

CN 101163895 A 4/2008

\* cited by examiner

*Primary Examiner* — Emily Morgan
(74) *Attorney, Agent, or Firm* — Altis Law Group, Inc.

(57) ABSTRACT

A hinge mechanism includes a first rotation assembly, a second rotation assembly substantially parallel to the first rotation assembly, a first connection member, and a second connection member. The first and second rotation assemblies include a first and second pivoting shafts and a first and second brackets sleeved on the first and second pivoting shafts, respectively, and both the first and second brackets includes an engaging portion eccentrically formed on one end respectively thereof. The first connection member includes two pivotal portions. The pivotal portions are rotatably connected to the engaging portions of the first bracket and the second bracket, respectively. The second connection member is sleeved on the first pivoting shaft and the second pivoting shaft.

12 Claims, 6 Drawing Sheets

DUAL AXIS HINGE WITH ECCENTRIC CONNECTOR

BACKGROUND

1. Technical Field

The present disclosure generally relates to hinges, and more particularly to a hinge mechanism applied in an electronic device.

2. Description of Related Art

Many electronic devices, such as notebook computers, game machines, electronic books, and mobile phones, include hinged elements. To ensure that one part of an electronic device is capable of rotating relative to the other part and that the electronic device can be opened or closed more smoothly and quickly, a hinge mechanism applied in the electronic device often includes four gears to transmit the torque.

However, the gears occupy a large amount of space, which negatively impacts the ability for miniaturizing the electronic device. Additionally, the gears must be assembled to mesh accurately to avoid unsmooth rotation or even the hanging up of the hinge mechanism.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

The present embodiment of a hinge mechanism may be applied in any electronic device having two or more hinged parts, such as notebook computers, LCD monitors, or DVD players. In this embodiment, the hinge mechanism described and illustrated is applied in a notebook computer.

Figure 1:
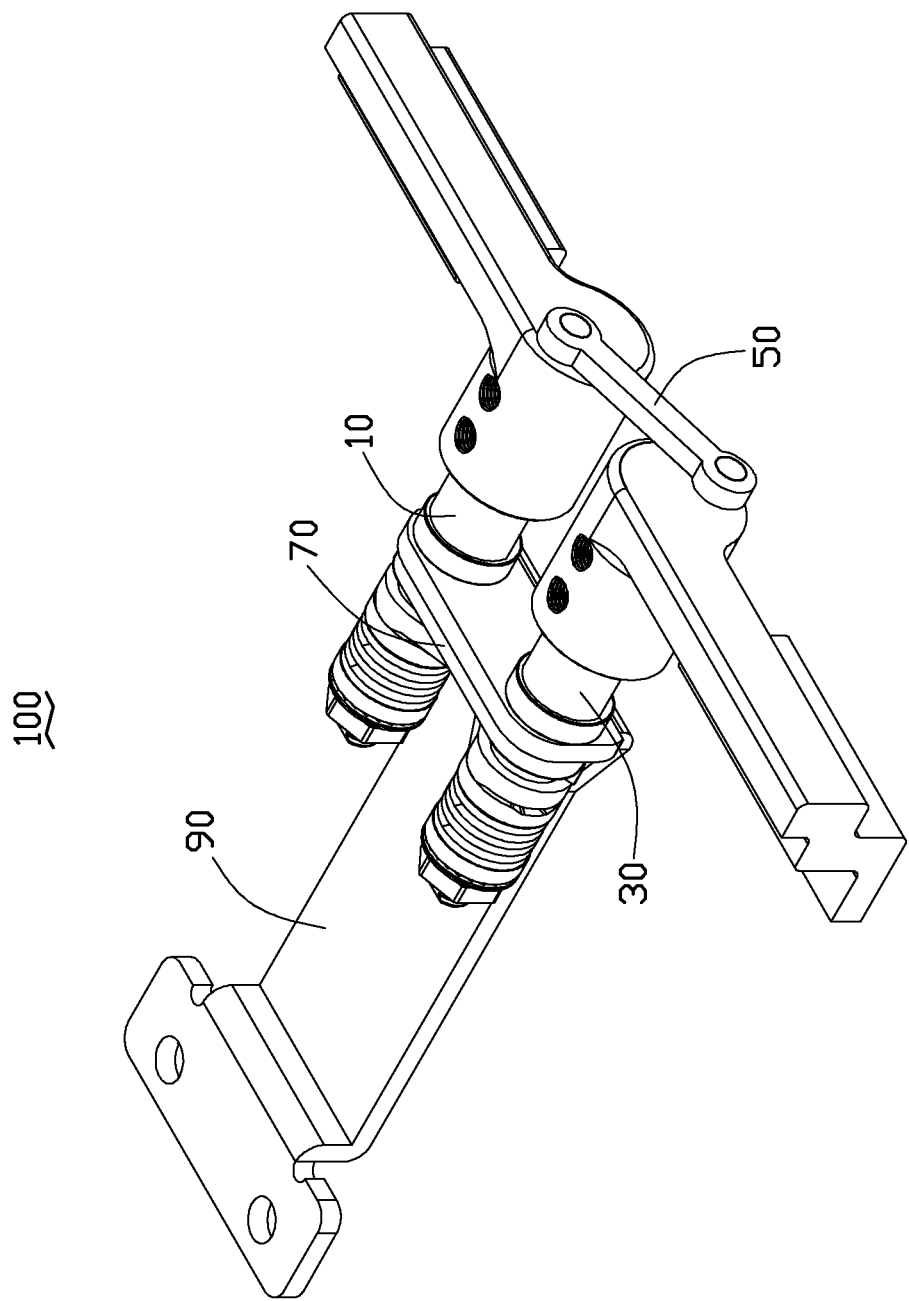
FIG. 1 is an assembled, isometric view of one embodiment of a hinge mechanism.

Referring to FIG. 1, a hinge mechanism 100 includes a first rotation assembly 10, a second rotation assembly 30 substantially parallel to the first rotation assembly 10, a first connection member 50, a brace member 70, and a second connection member 90. The first connection member 50 is rotatably connected to the first rotation assembly 10 and the second rotation assembly 30.

Figure 2:
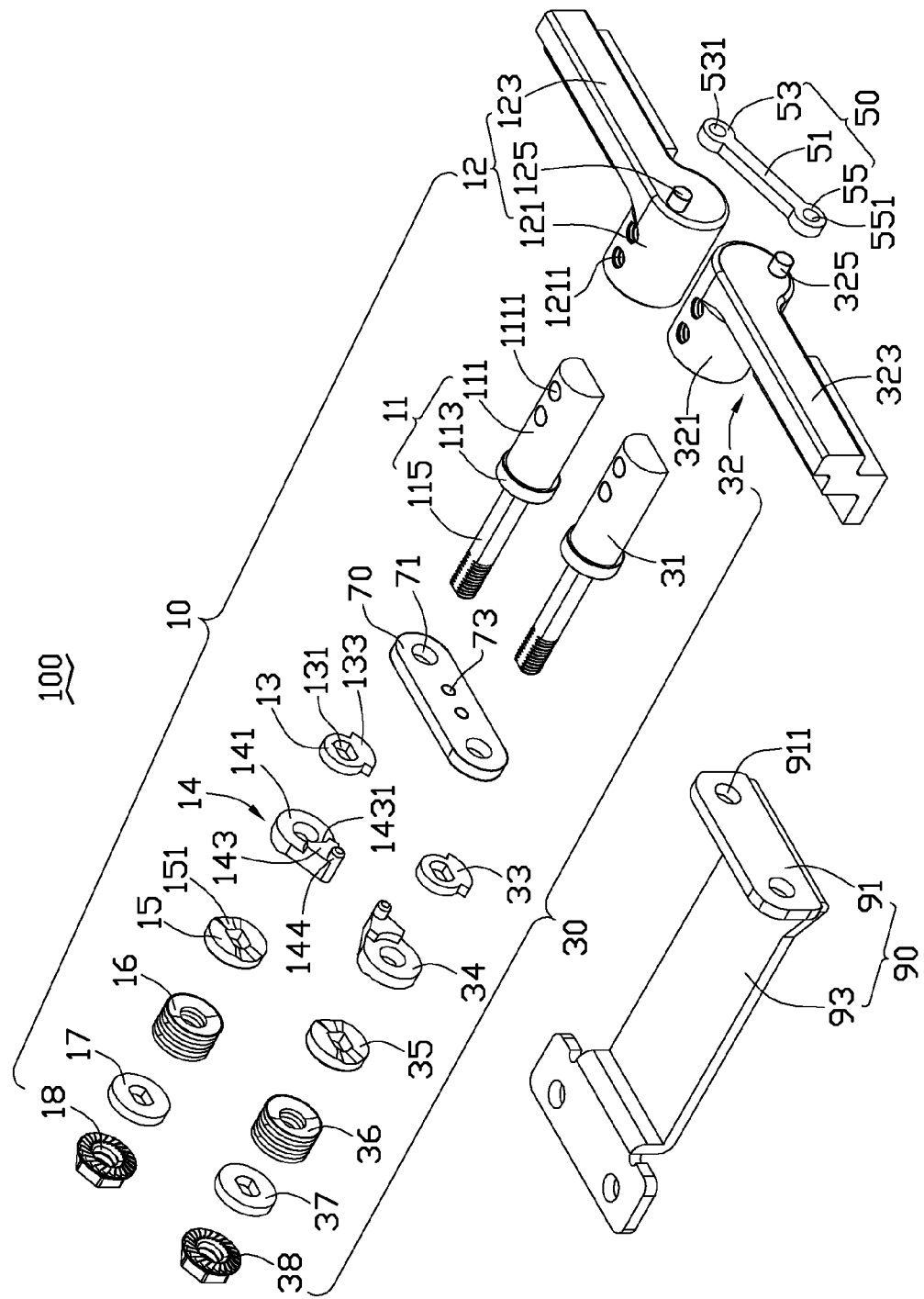
FIG. 2 is a partially exploded, isometric view of the hinge mechanism of FIG. 1.
Figure 3:
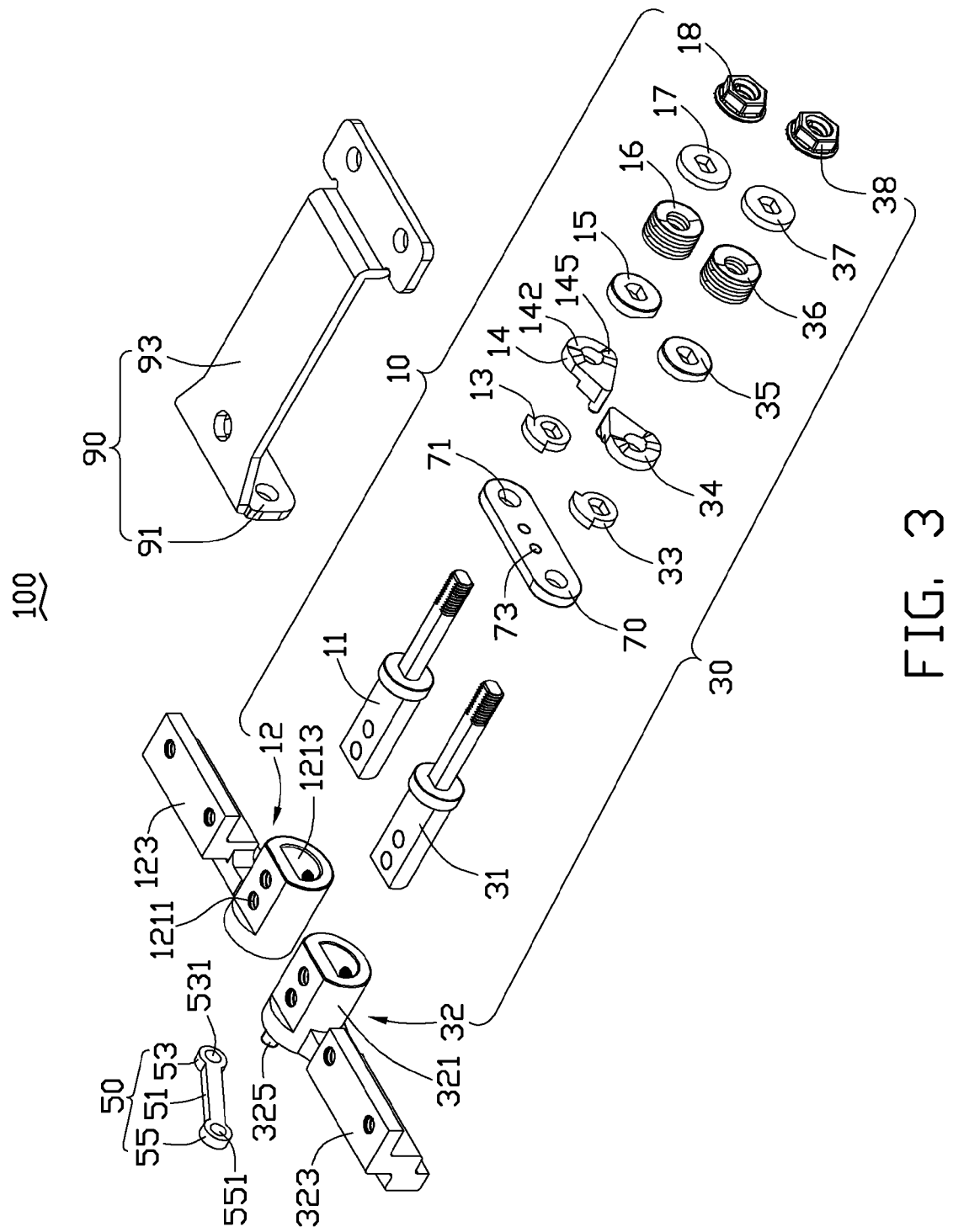
FIG. 3 is similar to FIG. 2, but viewed from another aspect.

Also referring to FIGS. 2 and 3, the first rotation assembly 10 includes a first pivoting shaft 11, a first bracket 12, a restriction member 13, a cam 14, a cam follower 15, a plurality of resilient members 16, a friction member 17, and a fastener 18; the fastener 18 is engaged with one end of the first pivoting shaft 11. The first bracket 12, the restriction member 13, the cam 14, the cam follower 15, the resilient members 16, and the friction member 17 are sleeved on the first pivoting shaft 11 in that order. The first bracket 12, the restriction member 13, the cam follower 15, the friction member 17, and the fastener 18 are non-rotatable relative to the first pivoting shaft 11.

The first pivoting shaft 11 includes a fixing portion 111, a flange 113, and a shaft portion 115 which is non-circular. The fixing portion 111 defines two connection holes 1111, and the shaft portion 115 defines a threaded portion (not labeled) at a distal end thereof. In the illustrated embodiment, a section of the fixing portion 111 is substantially semicircular. Alternatively, the fixing portion 111 may define one or more than two connection holes 1111.

The first bracket 12 includes a sleeve portion 121, an extending portion 123 substantially perpendicularly extending from one side of the sleeve portion 121, and an engaging portion 125 protruding from an end of the sleeve portion 121. The sleeve portion 121 defines two through holes 1211 in a radial direction thereof corresponding to the connection holes 1111 of the fixing portion 111 of the first pivoting shaft 11, and a receiving hole 1213, which is non-circular in an axial direction thereof corresponding to a profile of the fixing portion 111 of the first pivoting shaft 11. The through holes 1211 communicate with the receiving hole 1213. The engaging portion 125 is eccentrically formed on the end of the sleeve portion 121, that is, an axis of the engaging portion 125 does not align with an axis of the sleeve portion 121. In the illustrated embodiment, the receiving hole 1213 is substantially semicircular, and the engaging portion 125 is cylindrical shaped. Alternatively, the profile of the fixing portion 111 of the first pivoting shaft 11 may be other shapes, such as having a substantially triangular or rectangular cross-section, and the structure of the receiving hole 1213 is correspondingly modified.

The restriction member 13 defines a stopping hole 131 in a central portion (not labeled) thereof, and forms a restriction portion 133 extending from a circumference thereof. Alternatively, the restriction member 13 may form two, three, or other numbers of the restriction portions 133.

The cam 14 includes a first end surface 141, a second end surface 142 opposite to the first end surface 141, a blocking portion 143 protruding from the first end surface 141, a fixing pole 144 protruding from the blocking portion 143, and at least one projection 145 protruding from the second end surface 142. The blocking portion 143 is formed adjacent to an edge of the first end surface 141, and the fixing pole 144 is extending in an axial direction of the cam 14. The blocking portion 143 defines an arc-shaped recess 1431 recessing from a sidewall (not labeled) of the blocking portion 143 adjacent to a central portion of the cam 14. The blocking portion 143 allows the restriction member 13, but with the exception of the restriction portion 133 which blocks the blocking portion 143, thereof to rotate in the recess 1431. Therefore, the restriction member 13 is restricted to rotate relative to the cam 14 in a predetermined range. In the illustrated embodiment, the cam 14 forms two projections 145, and alternatively, the cam 14 may include one, or more than two projections 145 thereon.

The cam follower 15 defines at least one cutout 151 recessing from an end surface (not labeled) thereof opposing the second end surface 142 of the cam 14 and engaging with the projections 145 of the cam 14. In the illustrated embodiment, the cam follower 15 defines two cutouts 151. In alternative embodiments, the cam follower 15 may define one, or more than two cutouts 151, or the cam follower 15 may form any number of projections thereon, and the cam 14 defines the corresponding number of cutouts.

In the illustrated embodiment, the resilient members 16 are a plurality of disk-shaped elastic washers, the friction member 17 is a flat washer, and the fastener 18 is a screw nut. Alternatively, the first rotation assembly 10 may include a helical spring, an elastic rubber sleeve, or other elastic member instead, and the fastener 18 may be a rivet, and then the first pivoting shaft 11 correspondingly defines a pin hole.

The structure of the second rotation assembly 30 is the same as that of the first rotation assembly 10. The second rotation assembly 30 includes a second pivoting shaft 31 and a second bracket 32, a restriction member 33, a cam 34, a cam follower 35, a plurality of resilient members 36, a friction member 37 sleeved on the second pivoting shaft 31 in that order, and a fastener 38 engaging with one end of the second pivoting shaft 31. The structures of the elements of the second rotation assembly 30 are similar to that of the elements of the first rotation assembly 10. The second bracket 32, the restriction member 33, the cam follower 35, the friction member 37, and the fastener 38 are non-rotatable relative to the second pivoting shaft 31.

The second bracket 32 includes a sleeve portion 321, an extending portion 323 substantially perpendicularly extending from a side of the sleeve portion 321, and an engaging portion 325 protruding from an end of the sleeve portion 321. The engaging portion 325 is eccentrically formed on the end of the sleeve portion 321, that is, an axis of the engaging portion 325 does not align with an axis of the sleeve portion 321.

The first connection member 50 is substantially bar shaped which includes a shank portion 51, and a first pivotal portion 53 and a second pivotal portion 55 adjacent to opposite ends of the first connection member 50. The first pivotal portion 53 defines a sleeve hole 531, and the second pivotal portion 55 defines a sleeve hole 551. Alternatively, the first connection member 50 may form a plurality of protrusions protruding from the first pivotal portion 53 and the second pivotal portion 55, and the first bracket 12 and the second bracket 32 both define a plurality of insert holes eccentrically recessing from one end of the first bracket 12 and one end of the second bracket 32.

The brace member 70 is a plate which defines two shaft holes 71 adjacent to opposite ends thereof and two locking holes 73 between the shaft holes 71.

The second connection member 90 includes a resisting portion 91 and a bending portion 93 bending from one edge of the resisting portion 91. The resisting portion 91 defines two pivot holes 911 for the first pivoting shaft 11 and the second pivoting shaft 31, respectively. The bending portion 93 is substantially perpendicular to the resisting portion 91, and the bending portion 93 is configured to be connected to a connection arm between a lid and a main body of an electronic device (not shown).

During assembly of the hinge mechanism 100, the fixing portion 111 of the first pivoting shaft 11 is partially received in the receiving hole 1213 of the sleeve portion 121 of the first bracket 12, and the connection holes 1111 of the fixing portion 111 are assembled to align with the through holes 1211 of the sleeve portion 121. The first pivoting shaft 11 is fixed to the first bracket 12 with two fasteners (not shown), such as two screws or two pins passing through the connection holes 1111 and the through holes 1211. Therefore, the first pivoting shaft 11 cannot move in either radial direction or axial direction. The shaft portion 115 passes through one of the pivot holes 911 of the second connection member 90, one of the shaft holes 71 of the brace member 70, the stopping hole 131 of the restriction member 13, the cam 14, the cam follower 15, the resilient members 16, and the friction member 17 in that order, and engages with the fastener 18. Therefore, the elements sleeved on the first pivoting shaft 11 resist each other tightly. The first pivotal portion 53 of the first connection member 50 is sleeved on the engaging portion 125 of the first bracket 12.

The fixing pole 144 of the cam 14 is partially received in one of the locking holes 73 adjacent to the shaft hole 71 for the first pivoting shaft 11 passing through. The first end surface 141 of the cam 14 opposes the restriction member 13, and the second end surface of the cam 14 opposes the cam follower 15.

The second rotation assembly 30 is assembled in a same manner as the first rotation assembly 10, and the second pivotal portion 55 of the first connection member 50 is sleeved on the engaging portion 325 of the second bracket 32.

In the hinge mechanism 100, the first pivoting shaft 11, the second pivoting shaft 31, the first connection member 50, and the second connection member 90 cooperatively form a four-bar linkage. Because four edges of the four-bar linkage formed have predetermined lengths, the second rotation assembly 30 is capable of being rotated when the first rotation assembly 10 is rotated. Therefore, the electronic device using the hinge mechanism 100 is capable of being opened or closed at double-speed.

When the hinge mechanism 100 is rotated, the cam 14 rotates relative to the cam follower 15, such that the projections 145 of the cam 14 are received in or slid out of the cutouts 151 of the cam follower 15. Thereby, the axial force exerted between the elements sleeved on the first pivoting shaft 11 is changeable during rotation, and the axial force exerted between the elements sleeved on the second pivoting shaft 31 is also changeable in a same way. Furthermore, the hinge mechanism 100 is capable of being maintained at a number of predetermined positions by the engagement of the cam 14 and the cam follower 15 and the engagement of the cam 34 and the cam follower 35, respectively.

Figure 4:
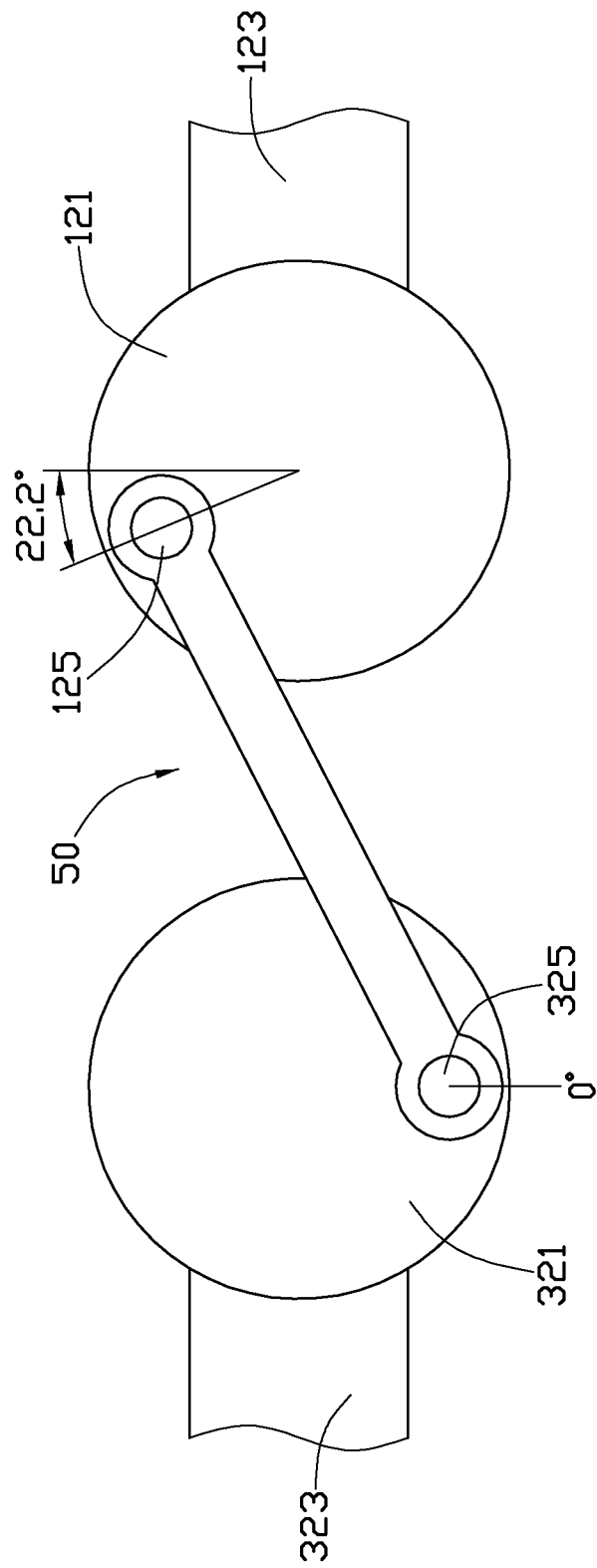
FIG. 4 is a schematic view of a rotation state of the hinge mechanism of FIG. 1.

Also referring to FIG. 4, when the extending portion 123 of the first bracket 12 is aligned with the extending portion 323 of the second bracket 32, the first pivotal portion 53 of the first connection member 50 is in a position that is 22.2 degrees deviating from a direction which is substantially perpendicular to the extending portion 123 of the first bracket 12, and the second pivotal portion 55 of the first connection member 50 is in a position that is in a direction which is substantially perpendicular to the extending portion 323 of the second bracket 32. During rotation, the first pivoting shaft 11 and the second pivoting shaft 31 rotate in different angular velocities.

Figure 5:
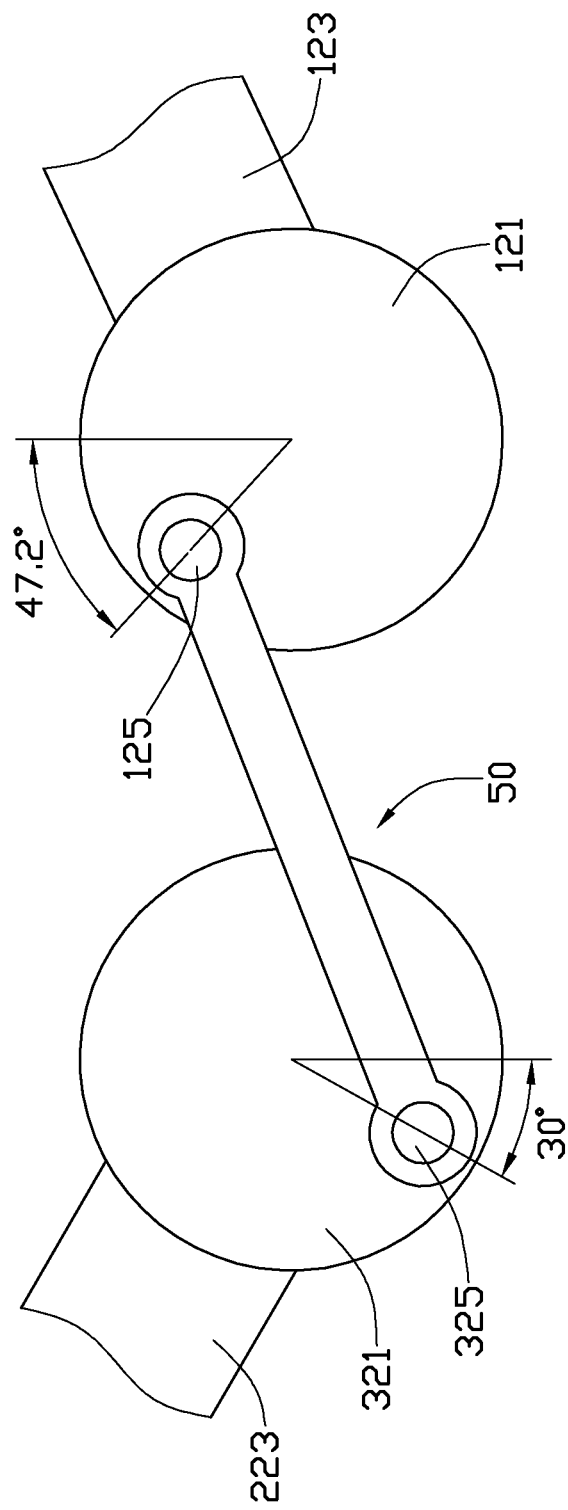
FIG. 5 is similar to FIG. 4, but shown in another state.

After being further rotated, the first pivotal portion 53 of the first connection member 50 further rotates through 25 degrees, and the second pivotal portion 55 further rotates through 30 degrees, as shown in FIG. 5.

Figure 6:
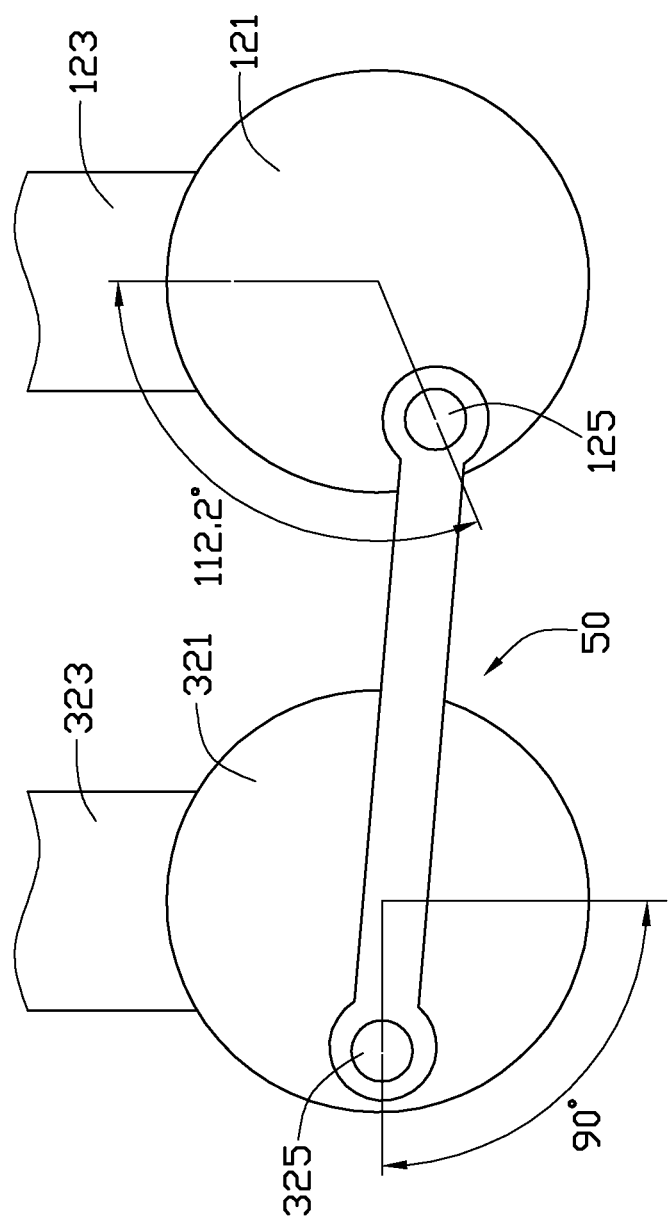
FIG. 6 is similar to FIG. 4, but shown in yet another state.

After being rotated, the first pivotal portion 53 of the first connection member 50 further rotates through 65 degrees, and the second pivotal portion 55 further rotates through 60 degrees, as shown in FIG. 6.

During the rotation, the first pivotal portion 53 of the first connection member 50 rotates in a higher speed than the second pivotal portion 55. Nevertheless, the rotation speed of the second pivotal portion 55 of the first connection member 50 exceeds that of the first pivotal portion 53 when rotating to a predetermined angle.

In the hinge mechanism 100, the first pivoting shaft 11, the second pivoting shaft 31, the first connection member 50, and the second connection member 90 cooperatively form the four-bar linkage. Thereby, the second rotation assembly 30 is driven to rotate when the first rotation assembly 10 is rotated, or in another way, the first rotation assembly 10 is driven to rotate when the second rotation assembly 30 is rotated. Thus the electronic device using the hinge mechanism 100 is capable of being opened or closed more quickly. Because gears are omitted, the hinge mechanism 100 may rotate more smoothly and does not hang up during rotation. Furthermore, the four-bar linkage hinge mechanism 100 takes relative less space than a hinge mechanism using gears, thereby facilitates the miniaturizing of the electronic device.

The brace member 70 enhances a strength of the second connection member 90, which allows the second connection member 90 to be made of thinner and lighter materials, and therefore, the weight and production cost of the hinge mechanism 100 is reduced.

One side of the cam 14 forms the blocking portion 143 for restricting the restriction member 13, and the other side of the cam 14 forms the projections 145 for adjusting the axial force. Because the cam 14 has multiple functions, the number of elements of the hinge mechanism 100 is reduced, and the hinge mechanism 100 is simplified.

The brace member 70 may be omitted, and the second connection member 90 then defines the locking holes 73 to engage with the fixing pole 144 of the cam 14 and the fixing pole (not labeled) of the cam 34.

The fixing portion 111 of the first pivoting shaft 11 may be engaged with the sleeve portion 121 of the first bracket 12 by interference fit. In this state, the section of the fixing portion 111 may be circular, and correspondingly the receiving hole 1213 of the sleeve portion 121 may be circular. The second pivoting shaft 31 and the second bracket 32 may have the same structures as the first pivoting shaft 11 and the first bracket 12, respectively.

The first bracket 12 and the second bracket 32 may be omitted, and the first pivoting shaft 11 forms an extending portion extending from one side, and the engaging portion 125 is formed on one end of the first pivoting shaft 11. Additionally, the second pivoting shaft 12 forms an extending portion extending from one side, and the engaging portion 325 is formed on one end of the second pivoting shaft 31.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge mechanism, comprising:
   a first rotation assembly comprising a first pivoting shaft and a first bracket sleeved on the first pivoting shaft, the first bracket comprising an engaging portion eccentrically formed on one end of the first bracket;
   a second rotation assembly substantially parallel to the first rotation assembly and comprising a second pivoting shaft and a second bracket sleeved on the second pivoting shaft, the second bracket comprising an engaging portion eccentrically formed on one end of the second bracket;
   a first connection member comprising two pivotal portions, wherein one pivotal portion is rotatably connected to the engaging portion of the first bracket, and the other pivotal portion is rotatably connected to the engaging portion of the second bracket; and
   a second connection member sleeved on the first pivoting shaft and the second pivoting shaft, wherein the first pivoting shaft comprises a fixing portion, a flange, and a non-circular shaft portion, the fixing portion is non-rotatably connected with the first bracket, and the flange resists the second connection member; the second pivoting shaft comprises a fixing portion, a flange, and a non-circular shaft portion, the fixing portion of the second pivoting shaft is non-rotatably connected with the second bracket, and the flange of the second pivoting shaft resists the second connection member.

2. The hinge mechanism of claim 1, wherein the engaging portions are cylindrical shaped, and the pivotal portions of the first connection member define a plurality of sleeve holes engaging with the engaging portions.

3. The hinge mechanism of claim 1, wherein the first connection member is bar shaped and the pivotal portions are adjacent to opposite ends of the first connection member.

4. The hinge mechanism of claim 1, wherein the first rotation assembly further comprises a cam and a cam follower resisting each other, one of the cam and the cam follower defines at least one cutout at an end surface facing the other one of the cam and the cam follower, and the other one of the cam and the cam follower forms at least one projection protruding from an end surface corresponding to the at least one cutout.

5. The hinge mechanism of claim 4, further comprising a brace member sleeved on the first pivoting shaft and the second pivoting shaft, wherein the brace member defines two shaft holes and two locking holes between the shaft holes, the first rotation assembly further comprises a restriction member resisting the cam and forming a restriction portion extending from a circumference of the restriction member, the cam forms a blocking portion protruding from one end of the cam and a fixing pole protruding from the blocking portion and non-rotatably received in one of the locking holes of the brace member, and the restriction portion of the restriction member is blocked by the blocking portion of the restriction member.

6. The hinge mechanism of claim 1, wherein the fixing portion of the first pivoting shaft is non-circular, the first bracket comprises a sleeve portion and an extending portion extending from one side of the sleeve portion, and the sleeve portion defines a receiving hole which is non-circular, and the fixing portion of the first pivoting shaft is partially received in the receiving hole; the structures of the second pivoting shaft and the second bracket are the same as that of the first pivoting shaft and the first bracket, respectively.

7. The hinge mechanism of claim 6, wherein the fixing portion of the first pivoting shaft defines at least one connection hole, the sleeve portion of the first bracket defines at least one through hole corresponding to the at least one connection hole of the first pivoting shaft, and the first pivoting shaft is fixed to the first bracket by at least one fastener engaging with the at least one connection hole and the at least one through hole.

8. A hinge mechanism, comprising:
   a first rotation assembly comprising a first pivoting shaft and a first bracket forming an engaging portion eccentrically formed on one end of the first bracket;
   a second rotation assembly substantially parallel to the first rotation assembly, the second rotation assembly comprising a second pivoting shaft and a second bracket forming an engaging portion eccentrically formed on one end of the second bracket;
   a brace member sleeved on the first pivoting shaft and the second pivoting shaft, the brace member defining two shaft holes and two locking holes between the two shaft holes;
   a first connection member comprising two pivotal portions, one pivotal portion rotatably connected to the engaging portion of the first rotation assembly and the other pivotal portion rotatably connected to the engaging portion of the second rotation assembly; and
   a second connection member sleeved on the first pivoting shaft and the second pivoting shaft, wherein the first rotation assembly, the second rotation assembly, the first connection member, and the second connection member cooperatively form a four-bar linkage, the first rotation assembly and the second rotation assembly have the same structures, the first rotation assembly further comprises a cam and a cam follower resisting each other, one of the cam and the cam follower defines at least one cutout at an end surface facing the other one of the cam and the cam follower, and the other one of the cam and the cam follower forms at least one projection protruding from an end surface corresponding to the at least one cutout, the first rotation assembly further comprises a restriction member resisting the cam and forms a restriction portion extending from an circumference of the restriction member, the cam forms a blocking portion protruding from one end of the cam and a fixing pole protruding from the blocking portion and non-rotatable received in one of the locking holes of the brace member, and the restriction portion of the restriction member is blocked by the blocking portion of the restriction member.

9. The hinge mechanism of claim 8, wherein the engaging portions are cylindrical shaped, and the pivotal portions of the first connection member define a plurality of sleeve holes engaging with the engaging portions of the first bracket and the second bracket, respectively.

10. The hinge mechanism of claim 8, wherein the first connection member is bar shaped and the pivotal portions are adjacent to opposite ends of the first connection member.

11. The hinge mechanism of claim 8, wherein the fixing portion of the first pivoting shaft is non-circular, the first bracket comprises a sleeve portion and an extending portion extending from one side of the sleeve portion, and the sleeve portion defines a receiving hole which is non-circular, and the fixing portion is partially received in the receiving hole; the structures of the second pivoting shaft and the second bracket are the same as that of the first pivoting shaft and the first bracket, respectively.

12. The hinge mechanism of claim 11, wherein the fixing portion of the first pivoting shaft defines at least one connection hole, and the sleeve portion of the first bracket defines at least one through hole corresponding to the at least one connection hole of the first pivoting shaft, and the first pivoting shaft is fixed to the first bracket by at least one fastener engaging with the at least one connection hole and the at least one through hole.

* * * * *